(12) United States Patent
Bartolucci

(10) Patent No.: US 8,980,345 B2
(45) Date of Patent: Mar. 17, 2015

(54) FERMENTED BAKERY DOUGH TOLERANT TO PROOFING

(75) Inventor: Jean-Charles Bartolucci, St Andre Lez Lille (FR)

(73) Assignee: Lesaffre et Compagnie, Paris (FR)

( * ) Notice: Subject to any disclaimer, the term of this patent is extended or adjusted under 35 U.S.C. 154(b) by 26 days.

(21) Appl. No.: 13/390,347

(22) PCT Filed: Sep. 2, 2010

(86) PCT No.: PCT/IB2010/053957
§ 371 (c)(1),
(2), (4) Date: Feb. 14, 2012

(87) PCT Pub. No.: WO2011/027317
PCT Pub. Date: Mar. 10, 2011

(65) Prior Publication Data
US 2012/0141631 A1    Jun. 7, 2012

(51) Int. Cl.
*A21D 8/04*    (2006.01)
*A21D 10/00*    (2006.01)

(52) U.S. Cl.
CPC ....................................... *A21D 8/047* (2013.01)
USPC .............................. 426/20; 426/19; 426/549

(58) Field of Classification Search
CPC .......... A21D 8/04; A21D 10/00; A21D 8/047
USPC ............................................... 426/20, 19, 549
See application file for complete search history.

(56) References Cited

U.S. PATENT DOCUMENTS

| 4,680,182 | A | 7/1987 | Kawai |
| 5,639,496 | A | 6/1997 | Nguyen et al. |
| 6,465,027 | B1 * | 10/2002 | Taillade et al. ................. 426/61 |

FOREIGN PATENT DOCUMENTS

| EP | 0078182 | 5/1983 |
| EP | 0636692 | 2/1995 |
| EP | 0903082 | 3/1999 |
| EP | 1808074 | 7/2007 |
| NL | EP0442575 | * 4/1996 ............... A21D 2/18 |
| WO | WO2009097333 | 8/2009 |

OTHER PUBLICATIONS

Lourens-Hattingh, A. et al. Fd. Res. Int. 34: 791-796 (2001).*

* cited by examiner

*Primary Examiner* — Hamid R Badr
(74) *Attorney, Agent, or Firm* — Jerold I. Schneider; Schneider Rothman IP Law Group

(57) ABSTRACT

A yeast, *Saccharomyces chevalieri* and/or *Saccharomyces cerevisiae* var. *boulardii* stabilizes bread fermentation during proofing. A bakery dough composition includes the yeast *Saccharomyces chevalieri* and/or *Saccharomyces cerevisiae* var. *boulardii*. A method for preparing a cooked or fresh product from the bakery dough composition that includes the yeast.

17 Claims, 4 Drawing Sheets

FERMENTED BAKERY DOUGH TOLERANT TO PROOFING

CROSS-REFERENCE TO RELATED APPLICATIONS

Figure 1:
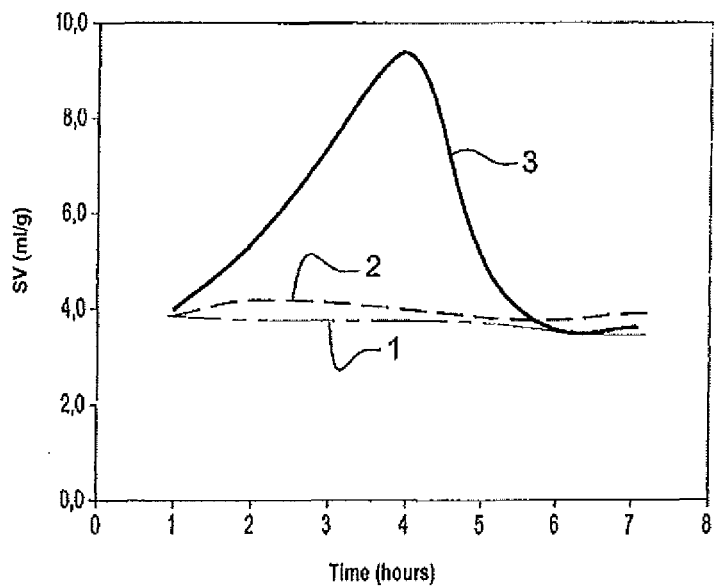

This application is the entry into the United States of PCT Application Number PCT/IB2010/053957 filed Sep. 2, 2010, the entirety of which is hereby incorporated by reference.

The invention relates to the use of yeast for stabilizing bread fermentation during the proofing phase of bakery dough, to a bakery dough composition comprising this yeast, and to a method for preparing a baked or fresh product from the bakery dough composition.

Traditionally, bread fermentation starts when the yeast is put into contact with the flour and water, and continues up to the first minutes of baking.

The bread fermentation cycle comprises several phases separated by manual or mechanical operations. These different fermentation phases are the following: bulk fermentation, relaxation and proofing. The duration of these different phases may vary depending on the dough mixing and/or fermentation method used.

The first bulk fermentation phase (first fermentation) follows the dough mixing step, and has the purpose of giving the yeast the required time in order to adapt to the medium, and to produce on the one hand the carbon dioxide indispensable for raising the dough, and on the other hand ethyl alcohol as well as a certain number of other products from the degradation of sugars.

This first bulk fermentation phase is followed by mechanical operations and then by the relaxation phase (second fermentation) which allows relaxation of the dough before it is shaped into pieces of dough.

The proofing phase (last fermentation phase) follows the shaping step and precedes the baking. This proofing phase allows optimization of the development of the dough before it is baked. The previously shaped pieces of dough will develop by means of the gas thrust.

During the proofing, gas thrust occurs mainly related to the fermentation of maltose from the flour starch. This gas thrust leads to the development of a gluten-based cellular structure as well as the diffusion and retention of the carbon dioxide in this structure, thereby stabilizing the pieces of dough before they are baked.

Indeed, the physical strength of the pieces of dough is both based on the fermentative activity during the proofing and on the condition of the gluten-based structure. If the pressure of the gas inside the pieces of dough is high but the wall of the bubbles formed inside the dough has become porous, development is poorly achieved. If conversely, the gluten retains good extensibility and remains impermeable, the pieces of dough may undergo long duration proofing provided that fermentation is still sufficiently active.

The duration of the proofing depends on the previously explained compromise, and it may be preferable to shorten it so that the piece of dough keeps better possibilities of development in the oven.

This amounts to estimating the maturity of dough upon its introduction into the oven depending on its fermentative activity and on this retention of gas: this is the notion of tolerance.

All the yeast species do not have the same capability of fermenting maltose during the proofing phase. Therefore they do not have the same behavior during proofing.

Indeed, depending on the nature of the enzymes present in the yeast, the fermentation of maltose by the yeast exists and is achieved more or less rapidly and more or less significantly.

The fermentative power of the yeast towards maltose may influence the tolerance and therefore the duration of the proofing.

Moreover a bakery dough composition is known from patent application EP 0 078 182 A2, comprising a yeast resistant to alcohol such as *Saccharomyces chevalieri* and retaining its fermentative activity under cold conditions.

But this document neither describes the use nor the behavior of this yeast strain during the proofing phase.

Therefore there is still a need for yeast with which gas thrust during the proofing phase may be avoided, which would be too rapid, too significant in intensity, too long, thereby avoiding weakening the structure of the dough when the fermentation is carried out under standard preparation conditions.

An object of the invention is therefore the use of *Saccharomyces chevalieri* yeast and/or *Saccharomyces cerevisia* var. *boulardii* yeast for stabilizing bread fermentation during the proofing phase of a fermented bakery dough.

The use according to the invention has the advantage of allowing better control of the fermentation during the proofing phase at room temperature and therefore allowing easier preservation of the fermented dough, not requiring any pre-baking and/or cooling for stopping or slowing this fermentation which, when yeast normally used in bread fermentation is used, naturally continues.

Another object of the invention is a bakery dough composition comprising *Saccharomyces chevalieri* yeast and/or *Saccharomyces cerevisiae* var. *boulardii* yeast and at least one baking enhancer selected from bakery enzymes, oxidation agents, emulsifiers, fats, reducing agents, fermentable sugars conventionally used in bakery.

Another object of the invention is a method for preparing a baked or fried product from a bakery dough composition as previously mentioned.

This method consists in:
  forming a dough by mixing the flour, the water, the yeast, optionally at least one baking enhancer selected from bakery enzymes, oxidation agents, emulsifiers, fats, reducing agents, fermentable sugars, and between 0.5 and 10% by weight of *Saccharomyces cerevisiae* var. *boulardii* and/or *Saccharomyces chevalier* yeast,
  fermenting the bakery dough composition at a temperature comprised between 15° and 45° C. in order to obtain a fermented dough having a specific volume of at least 1 mL/g, and
  baking or cooling the fermented composition.

The yeast used according to the invention is preferably the one obtained from the *Saccharomyces chevalier* strain deposited at the <<National Collection of Yeast Cultures>> under reference NCYC 935, or the one obtained from *Saccharomyces cerevisiae* var. *boulardii* strain deposited at the <<Collection Nationale de Cultures de Microorganismes>> under reference CNCM I-3799 on Aug. 21, 2007.

The yeast used according to the invention may also be *Saccharomyces bayanus*.

The composition according to the invention may comprise a *Saccharomyces bayanus* yeast.

The composition according to the invention preferably comprises yeast in an amount comprised between 0.5 and 10% by weight, and preferably from 0.5 to 3% by weight based on the total weight of the composition.

The yeast may appear in an instantaneous dry or active dry form.

In the composition according to the invention, the enhancer may be present in an amount comprised between 0.5 and 5% by weight, and preferably between 1 and 3% by weight based on the total weight of the composition.

The composition may, according to a preferred embodiment, comprise at least one fermentable sugar in an amount ranging between 0 and 3% by weight and preferably between 0 and 2% by weight based on the total weight of the composition.

Preferably, the fermented bakery dough obtained according to the invention may have a specific volume of at least 1 mL/g.

Preferably, the yeast is present in the composition in an amount of at least $10^6$ cells per gram of composition.

In the method according to the invention, the yeast may be incorporated into the dough at a concentration of at least $10^6$ cells per gram of dough composition.

The method according to the invention may further comprise *Saccharomyces bayanus* yeast.

The use of the *Saccharomyces chevalier* yeast according to the invention, because of the good stability which it imparts to the bakery dough composition, avoids a restarting of the fermentation when the dough is removed from the cold.

Figure 2:
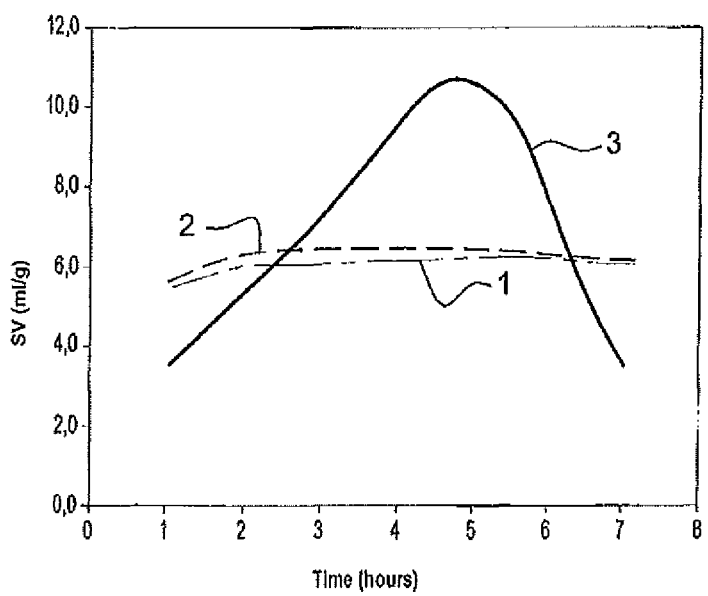
Figure 3:
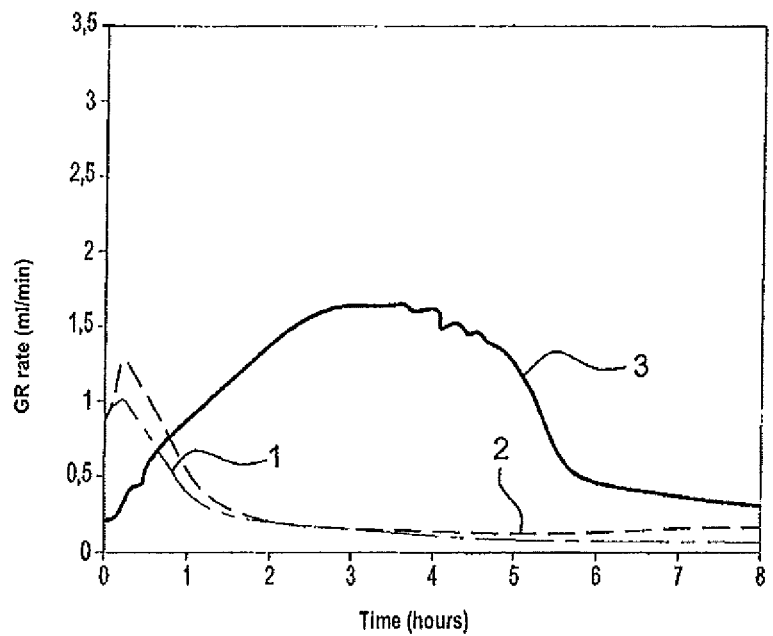
Figure 4:
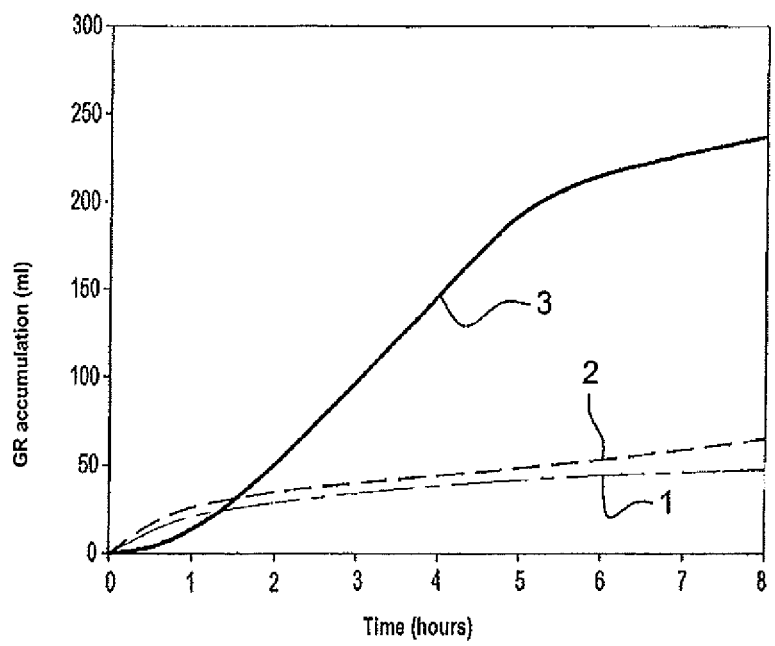
Figure 5:
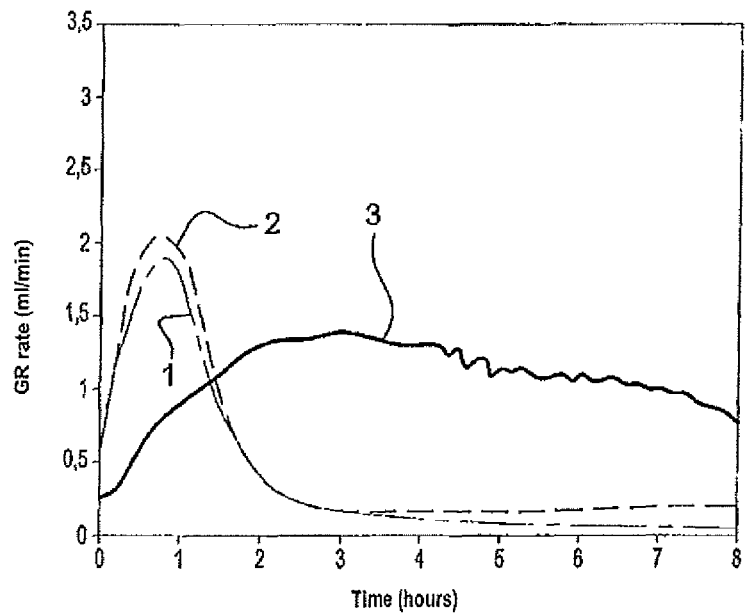

The invention will now be described in a more detailed way by means of the examples and figures which follow, only given as an illustration, and which are by no means limiting, and wherein:

FIG. 1 illustrates the evolution of the specific volume (SV) of the bread comprising 1% of enhancer, over time, during the proofing phase, at a temperature of about 35° C., FIG. 2 illustrates the evolution of the specific volume (SV) of the bread comprising 3% of enhancer, over time, during the proofing phase, at a temperature of about 35° C., FIG. 3 illustrates the fermentative profile obtained by measuring the rate of gas release related to fermentation over time, during the proofing phase, on a normal dough comprising 1% of enhancer, for the *Saccharomyces cerevisiae* var. *chevalier* yeast and *Saccharomyces bayanus* yeast used alone, as compared with a conventional bakery yeast, FIG. 4 is a mathematical model which illustrates the measurement of the accumulation of the rates of gas release corresponding to FIG. 3 over time, FIG. 5 illustrates the fermentative profile obtained by measuring the rate of gas release related to the fermentation over time, during the proofing phase, on a normal dough comprising 3% of enhancer, for the *Saccharomyces cerevisiae* var. *chevalieri* yeast and *Saccharomyces bayanus* yeast, used alone, as compared with conventional bakery yeast.

Figure 6:
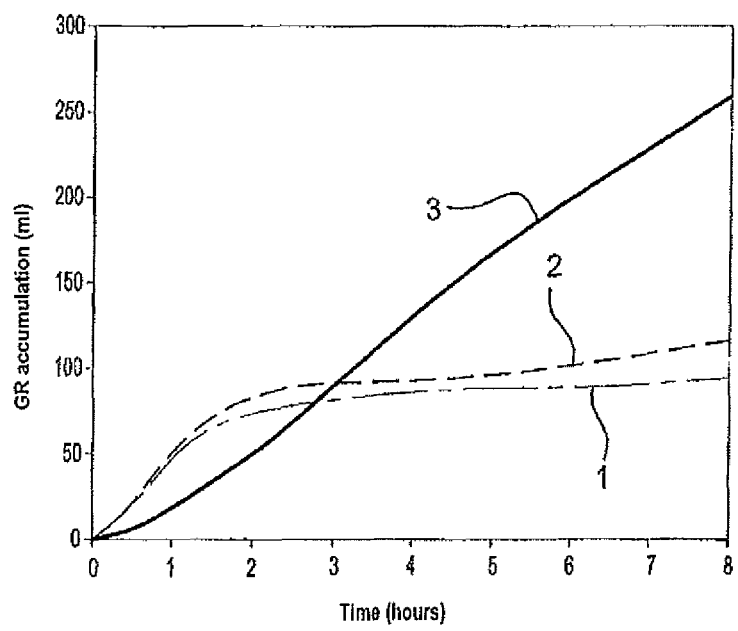
Figure 7:
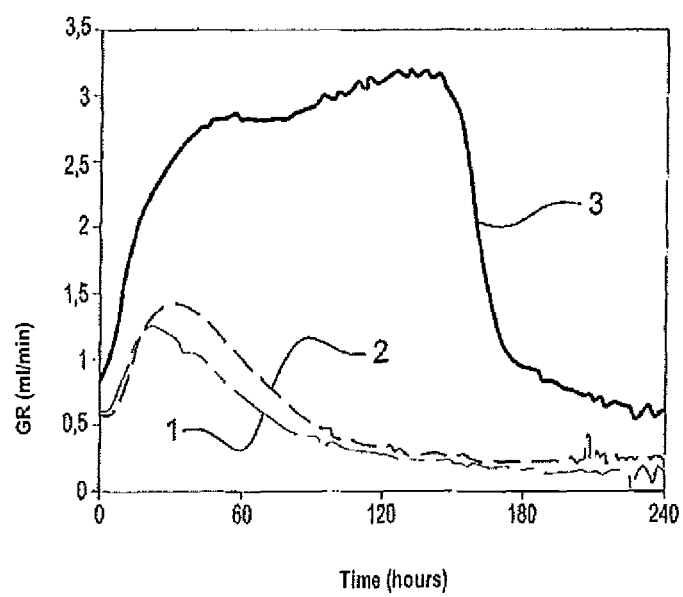
Figure 8:
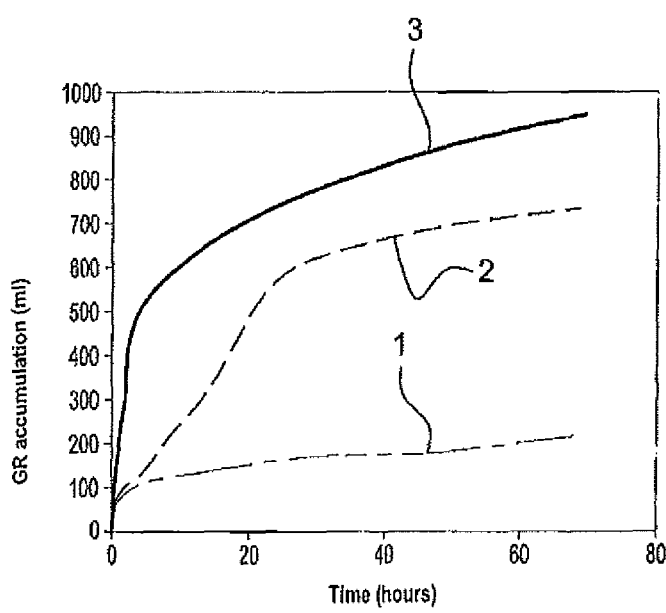

FIG. 6 is a mathematical model which illustrates the measurement of the accumulation of the rates of gas release corresponding to FIG. 5 over time, FIG. 7 illustrates the fermentative profile, over 3 days at 30° C. on a normal dough, obtained by measuring the rate of gas release related to fermentation over time, during the proofing phase, on a normal dough comprising 1% of enhancer, for the *Saccharomyces chevalier* yeast, *Saccharomyces* var. *boulardii* yeast and *Saccharomyces bayanus* yeast, used alone, as compared with conventional baker's yeast, FIG. 8 is a mathematical model which illustrates the measurement of the accumulation of the rates of gas release corresponding to FIG. 7 over time.

| EXAMPLE Ingredient | Composition for bakery dough Concentration |
|---|---|
| Wheat flour | 100% |
| Water | 65% |
| Fat | 2% |
| Salt | 2% |
| Yeast | 2% |
| Enhancer | 1 or 3% depending on the cases |

The proportions of the constituents are given as a weight percentage relatively to the percentage of flour which is used as a reference.

This composition is prepared by mixing, in a known way, all the constituents, first of at all at a slow rate and then at a fast rate at a temperature of about 24° C. The dough is left to rest for about 15 minutes before being divided into pieces of dough of about 250 g, and then put in molds. The dough is left to rise at a temperature of about 35° C. and a humidity of 75% for 1 to 8 hours. After fermentation, the pieces of dough are scored and then baked in the oven for about 25 minutes at 215° C. while regularly vaporizing steam on them.

As may be seen in FIGS. 1 and 2, the bread loaves produced with the *Saccharomyces chevalieri* yeast (reference 1) and *Saccharomyces bayanus* yeast (reference 2), as compared with a yeast conventionally used for bread making (reference 3), have a quasi constant specific volume during a period of time ranging from 1 to 7 hours of proofing; this is not the case with the yeast of reference 3 for which the volume continuously increases over time until it reaches a threshold corresponding to a collapse of the gluten structure of the bread.

The bread loaves produced from the yeast of references 1 and 2 have a tolerance to proofing which is interesting insofar as their volume remains constant over the whole duration of proofing regardless of the enhancer concentration in the dough of 1% (FIG. 1) or 3% (FIG. 2).

In FIGS. 3 to 6 the behavior of the *Saccharomyces chevalieri* yeast (reference 1) and *Saccharomyces bayanus* yeast (reference 2) is compared with that of a yeast (reference 3) conventionally used in bread making for use at a temperature of 30° C.

In these figures, it is seen that the yeast according to the invention (references 1 and 2), firstly and significantly assimilate the available pre-existing sugars of the flour (corresponding to the gas release peak over the first two hours) and then stop their activity when they are in the presence of maltose only.

These figures clearly show the stabilization of the bread fermentation of these yeasts during the proofing phase by non-assimilation of maltose or very small assimilation thereof.

In FIGS. 7 and 8, the behavior of the *Saccharomyces chevalieri* yeast (reference 1), *Saccharomyces cerevisiae* var. *boulardii* yeast (reference 2) and *Saccharomyces bayanus* yeast is compared with that of a yeast (reference 3) conventionally used in bread making for use at a temperature of 30° C.

These figures show a particularly slow fermentative profile for the yeast of reference 2, expressing an assimilation peak of the maltose comprised between 15 and 20 hours as compared with the yeast of reference 3 which shows an assimilation peak of maltose after about 2 hour.

The invention claimed is:
1. A method for stabilizing fermentation during the proofing phase of a fermented bakery dough comprising the step of introducing *Saccharomyces chevalieri* yeast and *Saccharomyces cerevisiae* var. *boulardii* yeast in said bakery dough.

2. The method according to claim 1, wherein the *Saccharomyces chevalieri* yeast is *Saccharomyces chevalieri* strain NCYC 935.

3. The method according to claim 1, wherein the *Saccharomyces cerevisiae* var *boulardii* yeast is *Saccharomyces cerevisiae* var. *boulardii* strain CNCM 1-3799.

4. The method according to claim 1, wherein *Saccharomyces bayanus* yeast is introduced in bakery dough.

5. The method according to claim 1, wherein at least one baking enhancer selected from the group consisting of bakery enzymes, oxidation agents, emulsifiers, fats, reducing agents, and fermentable sugars is introduced in said bakery dough.

6. The method according to claim 1, wherein the yeast is in an instant dry or active dry form.

7. The method according to claim 1, wherein at least one fermentable sugar is introduced in said bakery dough.

8. A bakery dough composition comprising *Saccharomyces chevalieri* yeast and *Saccharomyces cerevisiae* var. *boulardii* yeast according to claim 1, and at least one baking enhancer selected from the group consisting of bakery enzymes, oxidation agents, emulsifiers, fats, reducing agents, and fermentable sugars.

9. The composition according to claim 8, wherein it comprises *Saccharomyces bayanus* yeast.

10. The composition according to claim 8, wherein the composition comprises yeast in an amount between 0.5 and 10% by weight.

11. The composition according to claim 8, wherein the yeast is in an instant dry or active dry form.

12. The composition according to claim 8, wherein the composition comprises enhancer in an amount between 0.5 and 5% by weight.

13. The composition according to claim 8, wherein it comprises additionally at least one fermentable sugar.

14. The composition according to claim 13, wherein the composition comprises sugar in an amount between 0 and 3% by weight.

15. A method for preparing a baked or fried product from a bakery dough composition according to claim 8 consisting of
   forming a dough by mixing flour, water, the yeast, optionally at least one baking enhancer selected from the group consisting of bakery enzymes, oxidation agents, emulsifiers, fats, reducing agents, and fermentable sugars, and between 0.5% and 10% by weight of *Saccharomyces chevalieri* and *Saccharomyces cerevisiae* var. *boulardii* yeast,
   fermenting the bakery dough composition at a temperature comprised between 15° and 45° C. in order to obtain a fermented dough having a specific volume of at least 1 mL/g, and
   baking or cooling the fermented composition.

16. The method according to claim 15, wherein the yeast is incorporated into the dough at a concentration of at least $10^6$ cells per gram of dough composition.

17. The method according to claim 15, wherein it further comprises *Saccharomyces bayanus* yeast.

* * * * *